United States Patent [19]

Meeus et al.

[11] Patent Number: 5,082,622

[45] Date of Patent: Jan. 21, 1992

[54] ZINC ALLOY POWDER FOR ALKALINE BATTERIES

[75] Inventors: Marcel Meeus, Lommel; Yvan Strauven, Neerpelt, both of Belgium

[73] Assignee: S.A. Acec-Union Miniere N.V., Marcinelle, Belgium

[21] Appl. No.: 605,423

[22] Filed: Oct. 30, 1990

[30] Foreign Application Priority Data

Nov. 10, 1989 [BE] Belgium .............................. 0891197

[51] Int. Cl.$^5$ .............................................. C22C 18/00
[52] U.S. Cl. ...................................... 420/514; 420/518
[58] Field of Search ................................ 420/514, 518

[56] References Cited

U.S. PATENT DOCUMENTS

| 4,812,371 | 3/1989 | Shindou et al. | 420/514 |
| 4,952,368 | 8/1990 | Skenazi et al. | 420/514 |

FOREIGN PATENT DOCUMENTS

| 0021686 | 6/1973 | Japan | 420/519 |
| 0042930 | 12/1979 | Japan | 420/514 |
| 0190104 | 8/1988 | Japan | 420/514 |

*Primary Examiner*—Upendra Roy
*Attorney, Agent, or Firm*—Fred Philpitt

[57] ABSTRACT

A zinc base powder for alkaline batteries consisting of 0.005-2% aluminum, 0.005-2% lead, 0.003-2% bismuth and 0.001-2% indium, the rest being zinc and unavoidable impurities.

16 Claims, No Drawings

ZINC ALLOY POWDER FOR ALKALINE BATTERIES

The present invention relates to a zinc base powder for alkaline batteries.

Known zinc powders for alkaline batteries have either a high mercury content, or contain Cd and/or Tl. Hence, these powders have a good resistance to corrosion in the electrolyte of the battery. However, mercury is toxic and Cd and Tl are very toxic. The known zinc powders are thus quite hazardous for the environment.

The aim of the present invention is to provide a zinc base powder for alkaline batteries, which contains no or little mercury and which is free from Cd and Tl and nevertheless has a sufficient resistance to corrosion.

The powder according to the invention is characterized in that it contains 0.005-2% aluminium as well as either 0.0001-0.01% REM, REM being a rare earth metal or a mixture of rare earth metals;

or, besides zinc and unavoidable impurities, only 0.0001-2% of at least one of the elements indium and REM;

or, besides zinc and unavoidable impurities, only 0.003-2% bismuth and 0.0001-2% of at least one of the elements indium and REM;

or, besides zinc and unavoidable impurities, only 0.005-2% lead and 0.0001-2% of at least one of the elements indium and REM;

or, besides zinc and unavoidable impurities, only 0.005-2% lead, 0.003-2% bismuth and 0.0001-2% of at least one of the elements indium and REM.

All contents in this patent application are expressed in percentage by weight with regard to zinc.

REM can be any rare earth metal, such as for instance La, Ce, Pr or Nd, or any mixture of rare earth metals, such as for instance a mixture of La and Ce. For economic reasons REM is preferably mischmetal, an alloy with some 45% Ce, 45% La and 10% other rare earth metals.

When the powder contains 0.005-2% aluminium and 0.0001-0.01% REM, it can also contain one or more of the following elements: Hg (maximum 0.2%), Pb (0.005-2%), Bi (0.003-2%), Ga (0.005-0.2%), Mn (0.005-0.2%), an alkali metal (0.005-0.2%), an alkaline earth metal (0.005-0.2%).

The preferred compositions of the powder according to the invention are subject of the enclosed claims 2-35.

An easy way to produce the powder of the invention consists in adding all additives, which should be present in the powder to be produced (Al and for instance In, Pb and Bi), to the molten zinc and to atomize the thereby obtained alloy with gas, water or a mixture of both. One can also atomize molten zinc containing already a part of the additives (for instance: Al, Pb and Bi), whereafter the remaining additives (for instance: In) are deposited on the atomized powder, either by cementation from an aqueous solution, or by physical deposition from a gaseous phase ("Physical Vapour Deposition" or PVD), or by chemical deposition from a gaseous phase ("Chemical Vapour Deposition" or CVD). It is clear that the cementation technique can only be applied if the additives are more electropositive than zinc. When more additives have to be deposited on the atomized powder, they can be deposited simultaneously or separately. One can also atomize molten zinc as such and then deposit all additives on the atomized powder. It is also possible to introduce a specific additive partly by alloying with the molten zinc and the remainder by deposition on the atomized powder. When mercury is introduced, it can either be added to the molten zinc, or applied on the atomized powder by cementation, by deposition from a gaseous phase or by amalgamation. If the atomized powder is amalgamated, it will be possible to introduce into the powder together with Hg other additives, such as for instance In, completely of partly, by amalgamation with for example a Hg-In amalgam. Mercury can also be introduced partly by alloying with the molten zinc and partly by deposition on the atomized powder. Instead of atomization with gas, water or a mixture of both, any technique which is appropriate to convert a molten metal into a powder can be applied, such as for instance centrifugal atomization or casting and grinding of the casted metal.

The examples given hereafter prove that zinc base powders according to the invention have a good resistance to corrosion.

EXAMPLE 1

Starting from thermally refined zinc a molten zinc bath is prepared containing 220 ppm Al, 5 ppm La, 12 ppm Ce, 500 ppm Pb and 54 ppm In. This molten bath is homogenized at 450° C. by stirring. The molten alloy is made to flow in a jet of compressed air, thereby producing an alloy powder, the particles of which have substantially the same homogeneous composition as that of the homogeneous molten bath.

The alloy powder is sifted so as to separate thereof the fraction over 500 $\mu$m and, as far as possible, the fraction below 75 $\mu$m. In this way an alloy powder with a particle size of 75 to 500 $\mu$m is obtained.

The resistance of this powder to corrosion in alkalin medium is examined. To this end an electrolyte composed of 38% KOH, 2% ZnO and 60% H$_2$O is used. 25 g of the powder is put in 160 ml of this electrolyte, which is kept at 45° C., and the quantity of hydrogen that is released from the electrolyte for 3, 7 and 13 days is determined. The gassing rate is found to be respectively 4.6, 4.2 and 3.9 $\mu$l per gramme of powder and per day.

EXAMPLE 2

One operates in the same way as in example 1, but now a molten zinc bath is prepared containing 600 ppm Al, 500 ppm Pb, 500 ppm Bi and 100 ppm In.

Respectively the following gassing rates (in $\mu$l/g/day) are found: 5.6, 4.7 and 4.2.

Other typical examples of powders according to the invention have the following composition:

```
Zn—0.04% Al—0.02% In—0.05% Pb—0.013% Bi
Zn—0.05% Al—0.02% In—0.04% Pb
Zn—0.06% Al—0.015% In—0.06% Pb
Zn—0.03% Al—0.0025% La—0.0025% Ce—0.05% Pb
Zn—0.05% Al—0.0025% La—0.0025% Ce—0.05% Pb
Zn—0.05% Al—0.003% La—0.003% Ce—0.05% Pb
Zn—0.04% Al—0.02% In
Zn—0.05% Al—0.002% Ce—0.002% La
```

```
-continued
Zn—0.04% Al—0.025% In—0.003% Ce—0.003% La
Zn—0.04% Al—0.015% In—0.002% Ce—0.002% La—0.05% Hg
Zn—0.04% Al—0 025% In—0.003% Ce—0.003% La—0.01% Hg
Zn—0.05% Al—0.015% In—0.05% Pb
Zn—0.04% Al—0.002% Ce—0.002% La—0.04% Pb
Zn—0.05% Al—0.025% In—0.003% Ce—0.003% La—0.06% Pb
Zn—0.05% Al—0.02% In—0.002% Ce—0.002% La—0.05% Hg—0.04% Pb
Zn—0.05% Al—0.015% In—0.003% Ce—0.003% La—0.01% Hg—0.06% Pb
Zn—0.04% Al—0.02% In—0.02% Bi
Zn—0.05% Al—0.002% Ce—0.002% La—0.03% Bi
Zn—0.04% Al—0.02% In—0.003% Ce—0.003% La—0.01% Bi
Zn—0.04% Al—0.015% In—0.002% Ce—0.002% La—0.05% Hg—0.03% Bi
Zn—0.04% Al—0.025% In—0.003% Ce—0.003% La—0.01% Hg—0.02% Bi
Zn—0.05% Al—0.015% In—0.05% Pb—0.03% Bi
Zn—0.04% Al—0.002% Ce—0.002% La—0.05% Pb—0.01% Bi
Zn—0.05% Al—0.02% In—0.003% Ce—0.003% La—0.05% Pb—0.02% Bi
Zn—0.05% Al—0.015% In—0.002% Ce—0.002% La—0.05% Hg—0.05% Pb—0.01% Bi
Zn—0.05% Al—0.025% In—0.003% Ce—0.003% La—0.01% Hg—0.05% Pb—0.02% Bi
Zn—0.05% Al—0.002% Ce—0.002% La—0.03% Mn
Zn—0.04% Al—0.02% In—0.003% Ce—0.003% La—0.01% Na
Zn—0.04% Al—0.015% In—0.002% Ce—0.002% La—0.05% Hg—0.03% Ca
Zn—0.04% Al—0.025% In—0.003% Ce—0.003% La—0.01% Hg—0.02% Sr
Zn—0.04% Al—0.002% Ce—0.002% La—0.05% Pb .0.02% Ga—0.02% Na
Zn—0.05% Al—0.02% In—0.002% Ce—0.002% La—0.05% Pb—0.02% Li
Zn—0.05% Al—0.015% In—0.003% Ce—0.003% La .0.05% Hg—0.05% Pb—0.02% Mn
Zn—0.05% Al—0 025% In—0.002% Ce—0.002% La—0.01% Hg—0.05% Pb—0.02% Ca
Zn—0.05% Al—0.002% Ce—0.003% La—0.03% Bi—0.02% Mn—0.01% Li
Zn—0.04% Al—0.02% In—0.002% Ce—0.002% La—0.02% Bi—0.02% Ga
```

These powders contain besides zinc and unavoidable impurities, nothing else but said additives. Unavoidable impurities are impurities which are present in the zinc and in the additives.

We claim:

1. A zinc base powder for alkaline batteries consisting of 0.005-2% aluminum as well as besides zinc and unavoidable impurities, only 0.005-2% lead, 0.003-2% bismuth and 0.0001-2% of indium.

2. A powder according to claim 1 which contains 0.005-0.5% Al.

3. A powder according to claim 1 which contains 0.0025-0.2% In.

4. A powder according to claim 1 which contains 0.005-2% Pb.

5. A powder according to claim 1 which contains 0.003-2% Bi.

6. A powder according to claim 1, which contains 0.04% Al, 0.02% In, 0.05% Pb and 0.013% Bi.

7. A powder according to claim 1 which contains 0.05% Al, 0.015% In, 0.05% Pb and 0.03% Bi.

8. A powder according to claim 2 which contains 0.005-0.1% Al.

9. A powder according to claim 3 which contains 0.005-0.06% Al.

10. A powder according to claim 3 which contains 0.0025-0.05% In.

11. A powder according to claim 4 which contains 0.005-0.2% Pb.

12. A powder according to claim 4 which contains 0.003-2% Bi.

13. A powder according to claim 5 which contains 0.003-0.2% Bi.

14. A powder according to claim 9 which contains 0.02-0.06% Al.

15. A powder according to claim 11 which contains 0.01-0.1% Pb.

16. A powder according to claim 13 which contains 0.003-0.05% Bi.

* * * * *

UNITED STATES PATENT AND TRADEMARK OFFICE
CERTIFICATE OF CORRECTION

PATENT NO. : 5,082,622
DATED : Jan. 21, 1992
INVENTOR(S) : MEEUS et al

It is certified that error appears in the above-identified patent and that said Letters Patent is hereby corrected as shown below:

ON THE TITLE PAGE:

In section [57] ABSTRACT, line 3, correct "0.001-2%"

to --- 0.0001-2% ---.

Signed and Sealed this

Twenty-fifth Day of May, 1993

Attest:

MICHAEL K. KIRK

Attesting Officer

Acting Commissioner of Patents and Trademarks

UNITED STATES PATENT AND TRADEMARK OFFICE
CERTIFICATE OF CORRECTION

PATENT NO. : 5,082,622

DATED : January 21, 1992

INVENTOR(S) : MEEUS et al

It is certified that error appears in the above-identified patent and that said Letters Patent is hereby corrected as shown below:

Column 4, line 31, claim 9, delete "3" and insert -- 8 --.

Signed and Sealed this

Twentieth Day of July, 1993

Attest:

MICHAEL K. KIRK

*Attesting Officer*  *Acting Commissioner of Patents and Trademarks*